Figure 8:
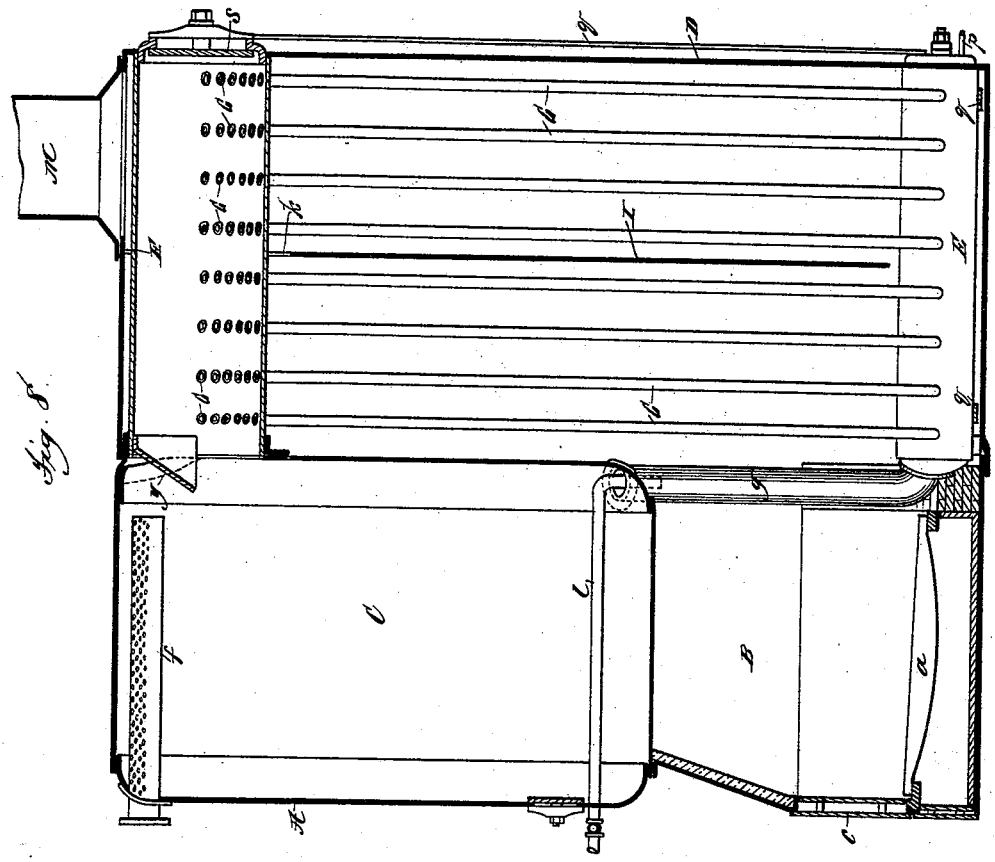

(No Model.) 9 Sheets—Sheet 1.
W. COWLES.
STEAM BOILER.
No. 396,545. Patented Jan. 22, 1889.
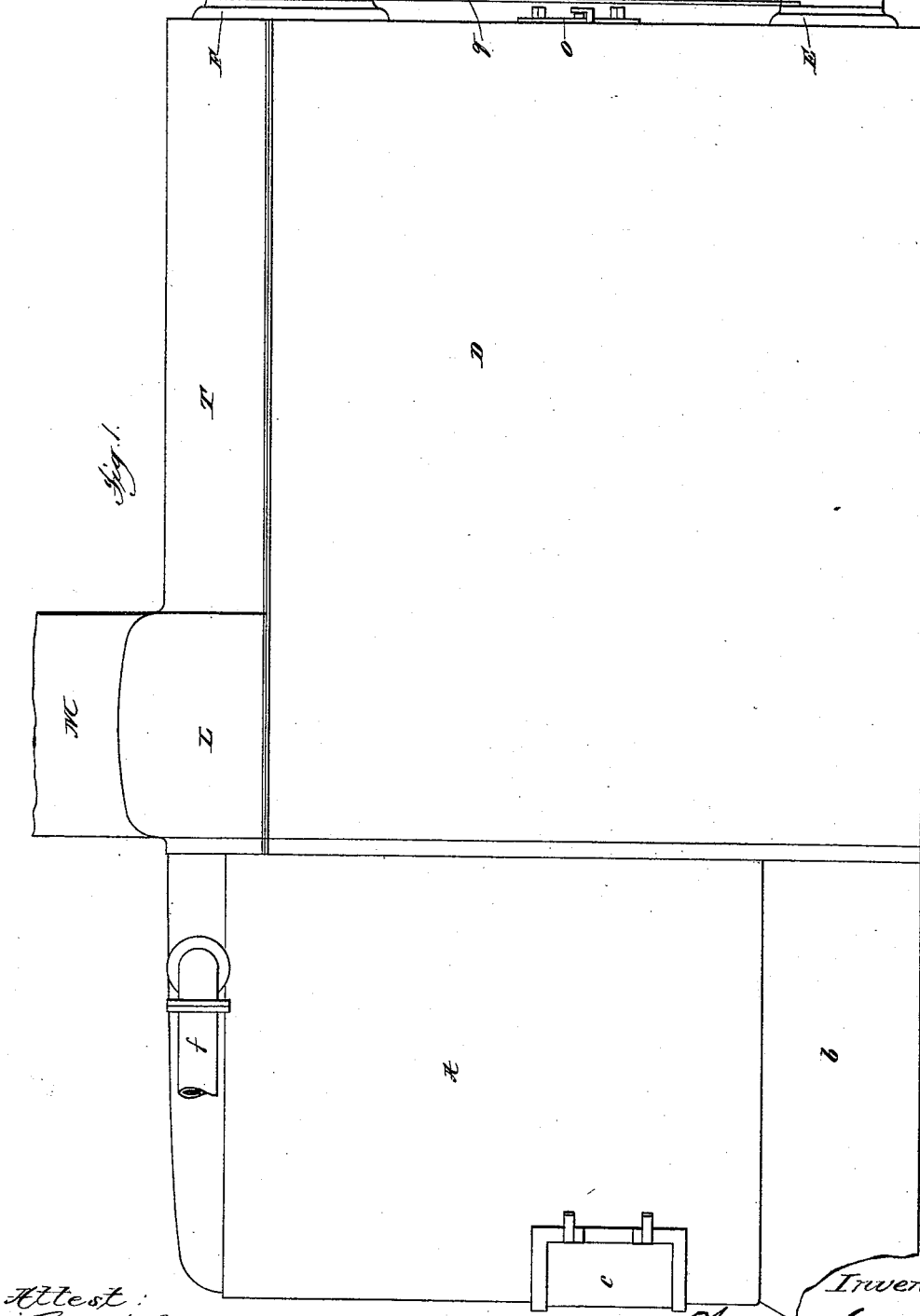

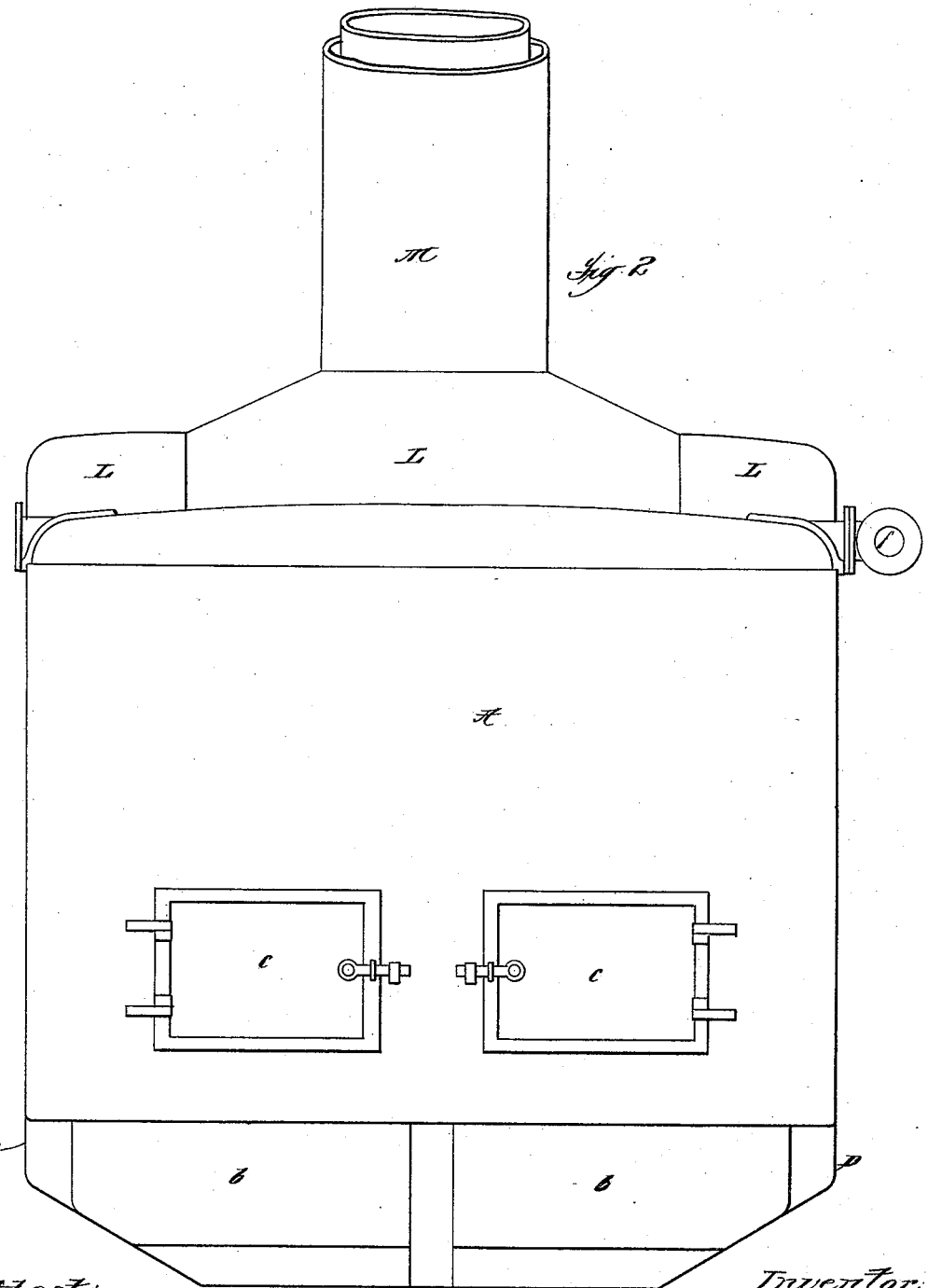

(No Model.) 9 Sheets—Sheet 3.
W. COWLES.
STEAM BOILER.
No. 396,545. Patented Jan. 22, 1889.
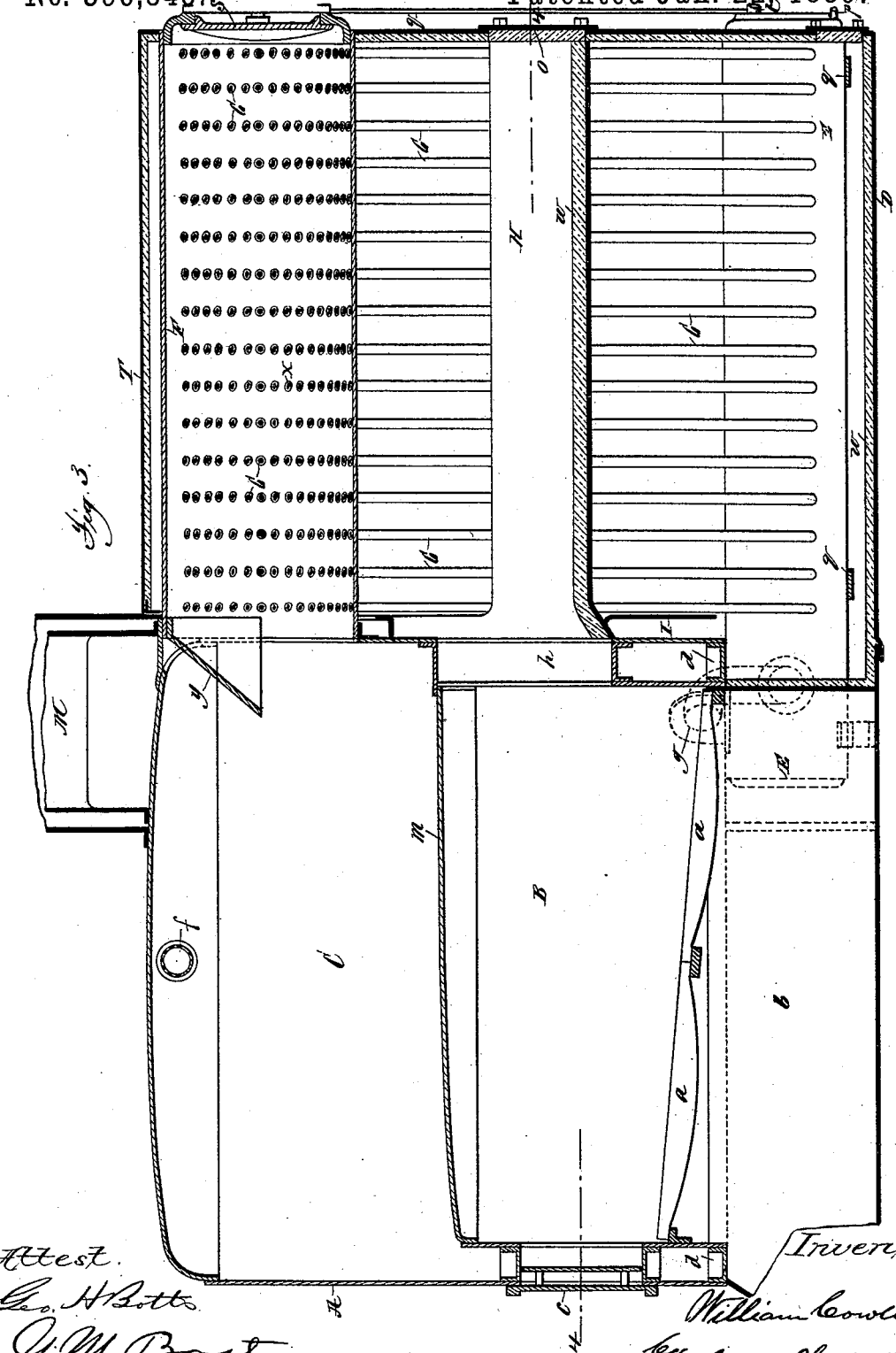

(No Model.) W. COWLES. 9 Sheets—Sheet 4.
STEAM BOILER.
No. 396,545. Patented Jan. 22, 1889.
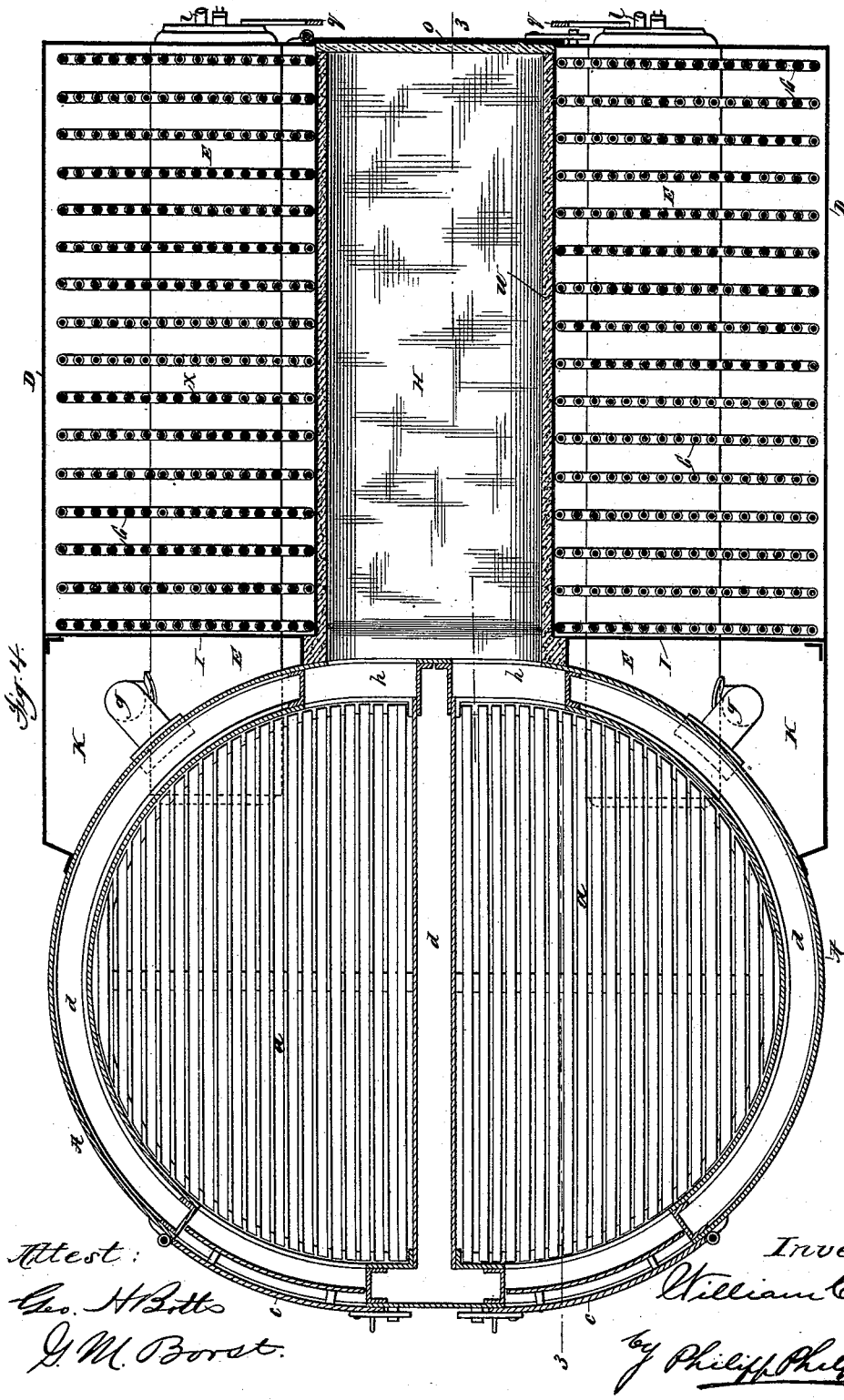

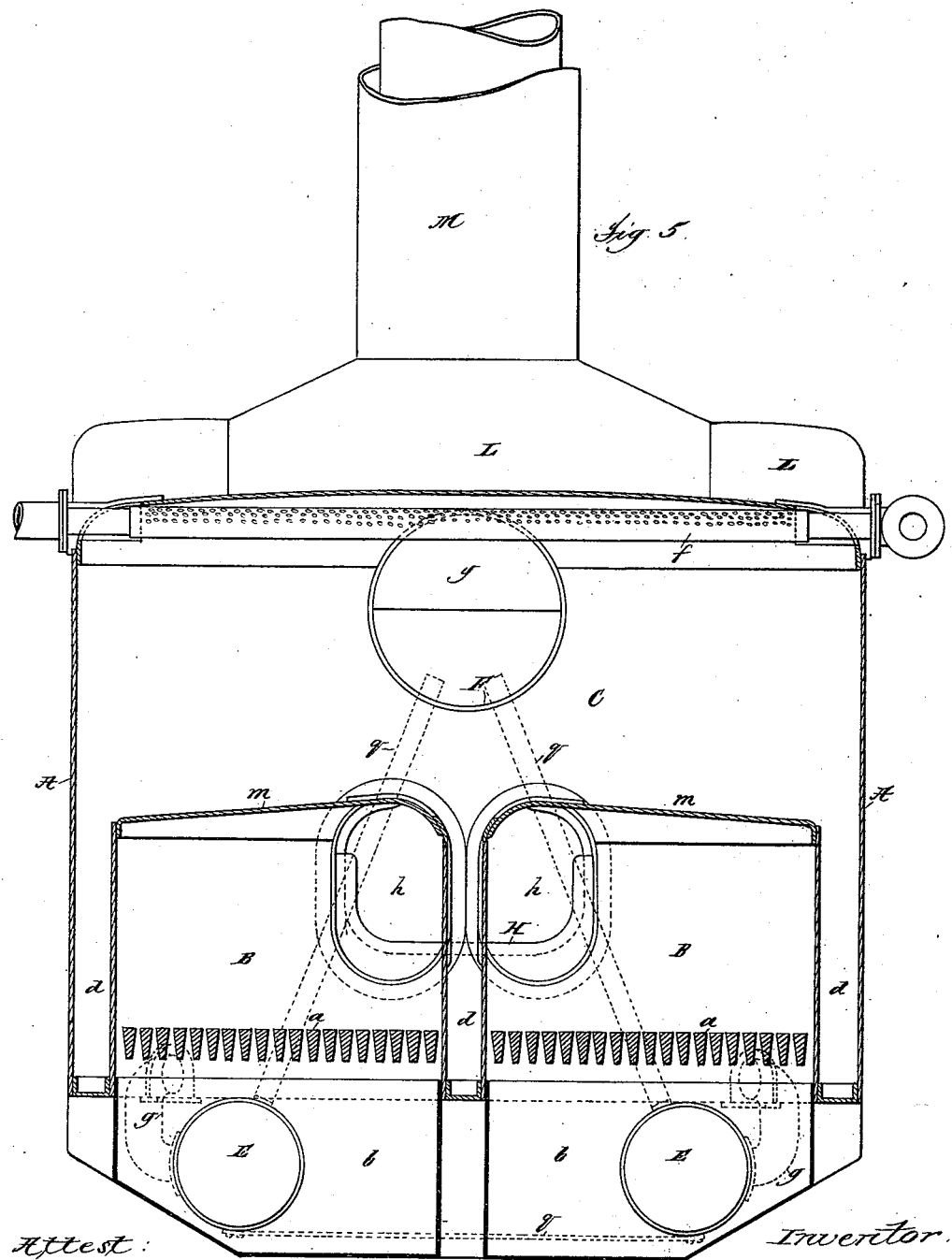

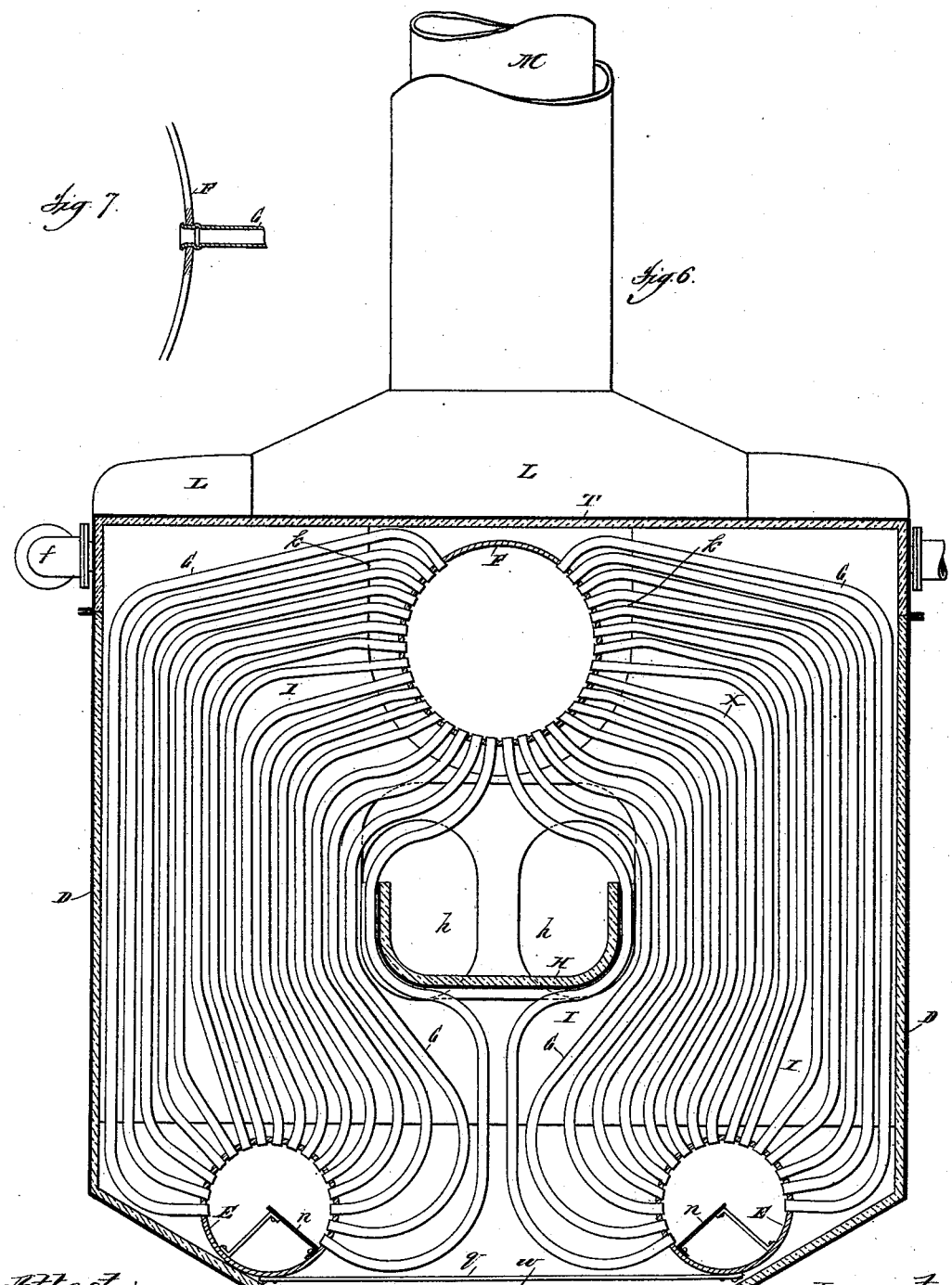

(No Model.) 9 Sheets—Sheet 7.

W. COWLES.
STEAM BOILER.

No. 396,545. Patented Jan. 22, 1889.

Attest:
Geo. H. Botts
G. M. Borst.

Inventor
William Cowles
J. Philip Philip & Hoove
Attys (No Model.) W. COWLES. 9 Sheets—Sheet 8.
STEAM BOILER.
No. 396,545. Patented Jan. 22, 1889.
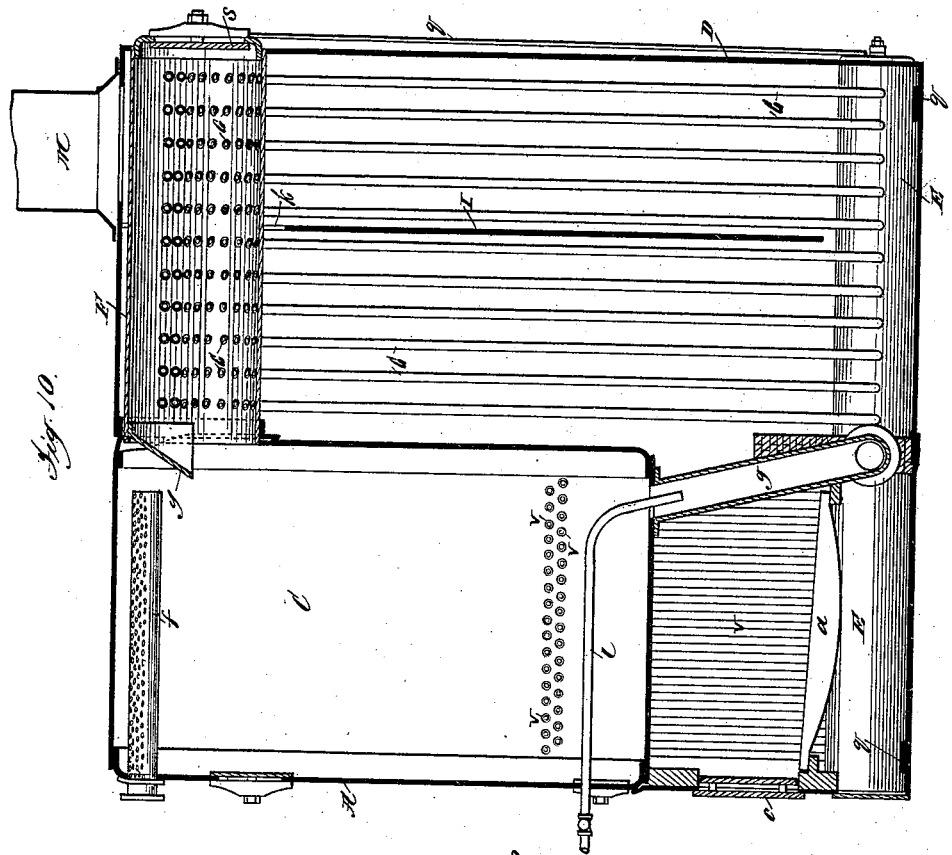
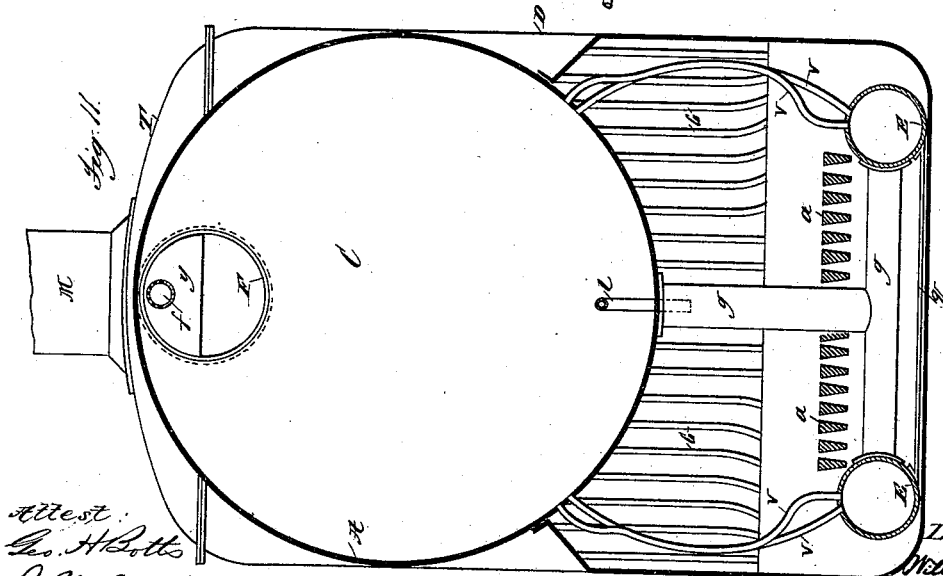

(No Model.) W. COWLES. 9 Sheets—Sheet 9.
STEAM BOILER.
No. 396,545. Patented Jan. 22, 1889.
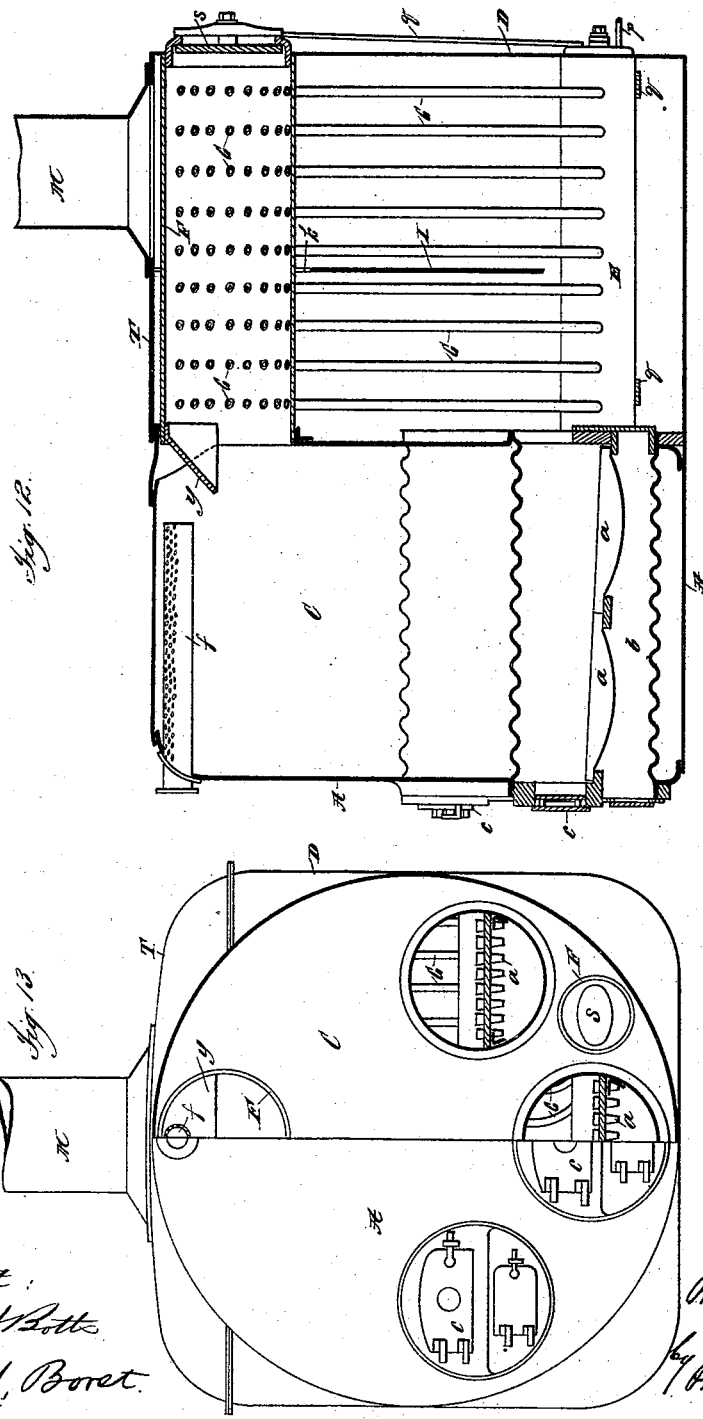

UNITED STATES PATENT OFFICE.

WILLIAM COWLES, OF BROOKLYN, NEW YORK.

STEAM-BOILER.

SPECIFICATION forming part of Letters Patent No. 396,545, dated January 22, 1889.

Application filed March 19, 1888. Serial No. 267,635. (No model.)

*To all whom it may concern:*

Be it known that I, WILLIAM COWLES, a citizen of the United States, residing at Brooklyn, county of Kings, and State of New York, have invented certain new and useful Improvements in Steam-Boilers, fully described and represented in the following specification and the accompanying drawings, forming a part of the same.

This invention relates to that general class of steam-boilers in which the water is caused to circulate from one or more water-drums located at the bottom of the boiler through circulating-tubes to one or more steam-drums located at or near the top of the boiler.

It is the object of the invention to provide a boiler of this general class which shall be light, compact, and simple in its construction, in which all of the parts shall be easily accessible for inspection and repair, in which the circulating-tubes can be separately removed and replaced without disturbing the other parts of the boiler, in which a maximum steaming capacity will be secured, in which a rapid circulation of all the water in the boiler is accomplished, thereby permitting salt-water to be used and the boiler to be forced without danger, in which danger from overheating or from a sudden and unequal heating and cooling will not be occasioned, and in which the use of screw-connections and joints are avoided.

In order to aid in a more ready understanding of the detailed description of the construction and organization of the boiler, which will be hereinafter given, a brief general description of the organization of the boiler will be first given.

The furnace portion of the boiler consists of a vertically or horizontally arranged shell in the lower part of which is located the furnace or furnaces, which is or are inclosed in plain or corrugated metal plates, and are provided with the usual grate-bars, beneath which are located the usual ash pit or pits. Extending rearward from the lower part of the furnace portion are one or more water-drums, into which the feed-water is introduced and from which it circulates upward through a large number of tubes which communicate with a horizontal steam drum or drums located at or near the top of the boiler, and communicating with a steam-chamber at the upper part of the furnace portion of the boiler. The water as it passes from the steam drum or drums enters the steam-chamber above the furnace or furnaces, and, falling upon the crown-sheets, passes through suitable water-legs, and is returned to the water-drums. The steam accumulating in the upper part of the steam-chamber enters a pipe and is conveyed to the place of use. The rear end or ends of the furnace or furnaces communicate with a casing which surrounds the water and steam drums and the circulating-tubes, so that the flame and the hot gases pass from the furnace or furnaces into this casing and circulate freely among the tubes and around the drums, which present a great amount of surface to absorb the heat. Suitable deflectors are located within the casing, and are so arranged as to cause a circulation of the flame and hot gases through all parts of the casing, and after being thus circulated and the greater part of their heat absorbed the gases pass through suitable flues and are conveyed to the smoke-stack. The circulating-tubes are expanded into the water and steam-drums, and are so arranged that any one or more of the tubes can be removed and replaced without disturbing any of the others or any permanent part of the boiler. The water drum or drums is or are provided with suitable baffle-plates, by which any sediment contained in the water is caused to accumulate in the bottoms of the water drum or drums, and is prevented from entering the circulating-tubes, and being thus carried to other parts of the boiler. The sediment thus accumulated can be readily blown off from time to time, as may be required.

Referring now to the accompanying drawings, the construction and organization of the boiler thus briefly outlined will be described in detail.

In said drawings, Figure 1 is a side elevation of a boiler constructed and organized according to the present invention. Fig. 2 is a front elevation of the same. Fig. 3 is a longitudinal vertical section of the same, taken on the line 3 of Fig. 4. Fig. 4 is a horizontal section of the same, taken upon the line 4 of Fig. 3. Fig. 5 is a vertical cross-section taken through the furnace portion of the boiler, looking toward the rear. Fig. 6 is a similar view taken through the steam and water drums, looking toward the front of the boiler. Fig. 7 is an enlarged detail view showing the manner in which the circulating-tubes are expanded into the steam and water drums. Figs. 8 to 13 are views similar to Figs. 3 and 5, illustrating modifications, which will be hereinafter explained.

Referring particularly to Figs. 1 to 6, it is to be understood that the furnace portion of the boiler consists of a round, oval, or rectangular shell, A, in the lower portion of which is located the furnace or furnaces B. As illustrated in these figures, there are two of the furnaces, B; but this is purely arbitrary—there may be one or more of the furnaces. These furnaces extend about one-half the height of the shell in which they are located, and are inclosed in metal plates in the usual manner. The furnaces are provided with the usual grate-bars, $a$, beneath which are ash-pits $b$. Access is had to the furnaces through suitable doors, $c$, located in the front of the shell. The sides of the furnaces are removed a short distance from the sides of the shell and from each other, so as to provide a water-space, $d$, which surrounds the furnaces down to the level of or slightly below the level of the grate-bars, and thus permits the water to circulate almost entirely around the furnaces.

The space in the furnace portion of the boiler above the furnaces B forms a steam-chamber, C, into which the water is discharged from the steam-drum, as will be hereinafter explained, and in which the steam accumulates as it is separated from the water. This chamber C is provided with a suitable pipe, $f$, (preferably perforated upon its upper side,) into which the steam passes from the chamber C, and by which it is conveyed to the place of use.

The rear or steam-generating portion of the boiler consists, primarily, of one or more horizontal water-drums, E, (two as shown in the present case,) which extend rearward from a point below the furnaces and communicate at their forward ends with the water-space $d$ by means of water-legs $g$, one or more horizontal steam-drums, F, (one as shown in the present case, which opens into the steam-chamber C above the furnaces, and a large number of circulating-tubes, G, which extend from the water-drums, E to the steam-drum F, all of these parts being inclosed in a suitable shell or casing, D, which unites with the rear side of the furnace portion of the boiler.

The water-tubes G, of which there are a great number, the number depending upon the size and capacity of the boiler, are arranged in substantially a vertical position; but are suitably bent, as best shown in Fig. 6, so as to accommodate themselves to the space in which they are required to be located, and to permit them to be readily connected to and disconnected from the steam and water drums, and also to allow them to spring as they are expanded and contracted, and thus not injure their connections with the drums. These tubes are arranged in rows, which extend transversely of the drums, each row containing a plurality of tubes, as shown in Fig. 4, with sufficient space between each two rows to permit of the introduction and removal of any one tube without disturbing any of the others. The ends of the tubes are united to the steam and water drums by being expanded into the openings in the drums, as shown in Fig. 7. This expanding is accomplished by the use of a suitable instrument well known for the purpose and need not therefore be particularly described. By this means the use of all screw-connections is avoided, which are very objectionable in boilers of this general class, particularly where the connections are exposed to great heat and to the action of salt-water.

The furnaces B are provided at their rear ends with openings $h$, located near the center of the furnace portion of the boiler, which communicate with the interior of the casing D, forming the rear portion of the boiler and inclosing the steam and water drums and the circulating-tubes. Extending rearward horizontally from a point beneath the openings $h$ is a trough-shaped deflector, H, which extends from the openings $h$ to the rear end of the boiler, and serves to direct the flame and the hot gases passing through the openings $h$ from the furnaces upward and laterally, so as to cause them to circulate among the tubes in the upper portion of the casing, after which the greater portion of the hot gases passes downward among the tubes and around the water-drums below. After circulating among the tubes and around the water-drums the hot gases pass beneath a vertical deflecting-plate, I, arranged in front of the circulating-tubes, and thence upward through flues K, located at the sides of the boiler which communicate with the base L of the smoke-stack M. The deflecting-plate I is cut away, so as to provide a small space around the steam-drum, as indicated at $k$, through which a portion of the hot gases, after circulating around the steam-drum and the tubes in the upper portion of the boiler, pass directly to the flues K and to the base of the stack.

The feed-water is supplied to the water-drums through pipes $l$, which communicate with the rear ends of these drums.

The operation of the boiler thus organized is as follows: The water-drums, the circulating-tubes, and the water-space $d$ being filled with water to a height somewhat above the crown-sheets $m$ of the furnaces, and a fire being started in the furnace, the flame and hot gases given off from the fire will pass through the openings $h$ above the deflector H, and thence circulate upward and laterally among the tubes G and around the steam-drum, a small portion of the hot gases passing out through the space $k$ to the smoke-stack. The greater part of the hot gases will, however, be carried downward among the tubes and around the water-drums and pass beneath the deflecting-plate I to the flues K. As the water in the water-drums and the tubes becomes sufficiently heated it will circulate upward through the tubes and enter the steam-drum F, and flow outward from this drum into the chamber C and fall upon the crown-sheets $m$, and flow thence into the water-space $d$, and be returned through the water-legs $g$ to the water-drums, and this circulation will continue. As the heated water flows into the steam-drum and thence outward into the chamber C, the steam contained therein will be liberated and will accumulate in the upper part of the chamber C and be drawn off through the pipe $f$.

By reason of the construction which has been described the flame and hot gases are caused to circulate thoroughly and be brought in contact with all of the circulating-tubes and all portions of the steam and water drums, thus presenting a great surface for the absorption of heat and securing an even heating of the water in all portions of the boiler.

It will also be observed that the flame and hot gases are for the most part carried into contact with the tubes and drums at right angles thereto, which secures the most effective heating.

The water-drums are provided with baffle-plates $n$, which are arranged as best shown in Fig. 6, and extend the entire length of the drums in such position as to prevent any sediment from being carried from the drums into the circulating-tubes which enter the drums nearest their bottoms. By this means any sediment contained in the water is prevented from being circulated through the boiler, and is caused to accumulate in the bottoms of the water-drums, from which it can be blown out through blow-off pipes $p$, located in suitable position for the purpose, or can be removed by other means. A similar baffle-plate, $y$, is located in front of the mouth of the steam-drum (see Fig. 3) and serves to direct the steam and water downward onto the crown-sheets $m$, and prevent water from being carried into the pipe $f$.

The rear portion of the boiler is provided with a door, $o$, which opens above the deflector H, and through which access can be had to the interior of this portion of the boiler for cleaning or for other purposes. A similar door, $z$, is located at the bottom of the rear portion of the boiler for the removal of soot. The steam and water drums project rearward through the casing D, which incloses them and the water-tubes, and are provided at their rear ends with man-holes having removable covers $s$. The top portion, T, of the casing D is made capable of removal without disturbing the other parts, as indicated in Fig. 6, so that access can be had to the interior of the casing for the purpose of removing and replacing any one or more of the water-tubes G, or for other purposes when necessary. It will also be observed that the sides of the casing D are made of such form as to allow of the ready removal and introduction of the tubes through the top of the casing.

It has been stated that any one or more of the tubes G can be removed and replaced without disturbing any of the others. This can be effected as follows: Assuming that one of the tubes, $x$, for example, (see Figs. 3, 4, and 6,) becomes damaged, so that it is necessary to remove it and replace it by a new tube, the boiler being emptied, the cover portion T of the casing D will be removed and the covers of the man-holes in the steam and water drums will be removed, so as to permit a workman to enter these drums. The ends of the tube expanded into the drums will be cut out by the use of suitable tools, and the damaged tube can then readily be moved to one side and lifted out. A new tube bent to the proper form will then be lowered into the space between the two rows of tubes, and its ends will be sprung into the openings in the steam and water drums. The tubes will be capable of being easily sprung sufficiently for this purpose. The ends of the tube will then be expanded into the openings in the steam and water drums, as shown in Fig. 7, by the use of a suitable instrument. In this manner any one or more of the tubes of the whole series can be removed and replaced at pleasure without disturbing any of the other tubes or any permanent portion of the boiler.

It is of course to be understood that the deflector H, and also such other exposed portions of the boiler as may be desirable, are made of asbestus or other fire-proof and non-conducting substance, $w$, backed or protected by metal plates. This is indicated in some of the figures of the drawings; but in others it has been omitted, as it forms no part of the present invention, but is simply an expedient always resorted to in boilers of this class. It is of course to be understood that the casing which incloses the water and steam drums and the circulating-tubes may be made up partly or wholly of brick-work or other masonry in those cases where such work is most available and desirable.

The construction and organization which are shown in Figs. 1 to 6, and which have been described, may be considerably modified in many particulars to suit different local conditions and to meet different requirements without departing from the essential features of the invention.

Figs. 8 to 13 illustrate some of the principal changes which may be so made.

Figure 9:
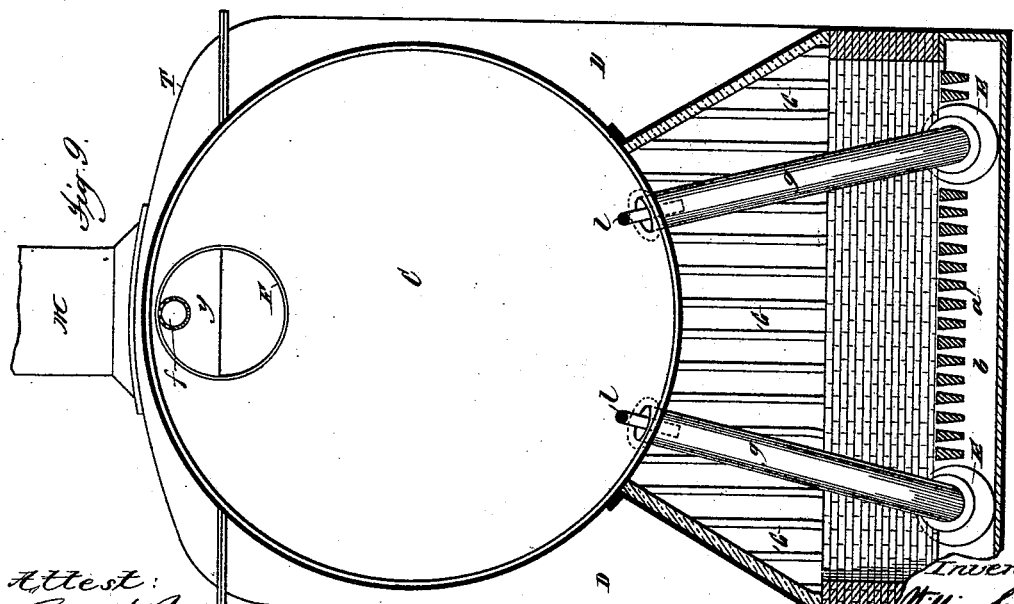

In the organization shown in Figs. 8 and 9 but a single furnace is employed, and this furnace, instead of being located within the shell A, which forms the steam-chamber C, is located directly beneath the shell, and the water, after passing into that chamber from the steam-drum, is returned directly to the water-drums through the water-legs $g$, instead of passing into the water-space $d$ around the furnace and thence to the water-drums. The water-legs $g$ are also in this case located in the furnace, and the feed-water, instead of being supplied directly to the water-drums, is supplied to the water-legs $g$. When the water is supplied at this point, the jets of incoming water aid in securing a circulation of the water through the boiler at the commencement of the steam-making operation. In this case, also, the smoke-stack is located at the extreme rear end of the boiler, and the deflecting-plate I is located between two of the rows of tubes G, about midway of the length of that portion of the boiler, and is so arranged that a portion of the hot gases and flame passes upward in front of the plate and through the opening $k$ directly to the smoke-stack, while the remaining and larger portion pass downward beneath the plate and thence upward to the smoke-stack.

The organization shown in Figs. 10 and 11 is substantially the same as that shown in Figs. 8 and 9, except that in this case the water-drums are extended forward beneath the grate-bars and communicate with the steam-chamber C by a large number of vertical pipes $v$, in addition to the water-legs $g$.

The organization shown in Figs. 12 and 13 illustrates the application of the invention to the well-known type of "Scotch" boiler. This organization is much the same as that shown in Figs. 1 to 6, but in this case the shell A is enlarged, so that both the steam and water drums communicate directly with it. In this case also there are three smaller furnaces employed, which are of cylindrical form and formed of corrugated plates, these furnaces being entirely within the shell A, so as to be entirely surrounded by the water therein. The feed-water in this case is supplied to the water-drums the same as in the organization first described.

In all of the organizations shown the pressure within the steam and water-drums will tend, as will readily be seen, to separate the drums—that is, move them away from each other. To counteract this, the drums are connected at their rear ends by tie-bars $q$, which form a triangle connecting the three drums, as shown. In the organization shown in Figs. 12 and 13 these tie-bars are required only at the rear ends of the drums, as the forward ends are held in position by the rear plate of the shell A. In the other organizations the water-legs and the tubes form ties to connect the forward ends of the water-drums to the shell A, and the water-drums are connected to each other by a horizontal tie-bar, $q$.

What I claim is—

1. In a steam-boiler, the combination, with horizontal water and steam drums and vertical or substantially vertical circulating-tubes connecting said drums, of the shell A, communicating with said drums and forming with the steam-drum a steam-chamber, C, substantially as described.

2. In a steam-boiler, the combination, with horizontal water and steam drums, of vertical or substantially vertical circulating-tubes connecting said drums and located in rows, with space between adjacent rows for the removal and insertion of any one tube without disturbing any of the others, and the shell A, communicating with said drums and forming with the steam-drum a steam-chamber, C, substantially as described.

3. In a steam-boiler, the combination, with horizontal water and steam drums and vertical or substantially vertical circulating-tubes connecting said drums, of the shell A, communicating directly with said steam-drum and forming a steam-chamber, C, and with said water drum or drums by a water leg or legs, substantially as described.

4. In a steam-boiler, the combination, with horizontal water and steam drums, of vertical or substantially vertical circulating-tubes connecting said drums and located in rows, with space between adjacent rows for the removal and insertion of any one tube without disturbing any of the others, the shell A, communicating directly with said steam-drum and forming a steam-chamber, C, and communicating also with said water drum or drums by a water leg or legs, substantially as described.

5. The combination, with the steam-drum F and the steam-chamber C, of the baffle-plate $y$, for directing the steam and water downward from the mouth of the steam-drum, substantially as described.

6. The combination, with the water drum or drums and the vertical or substantially vertical circulating-tubes G, of the baffle plate or plates $n$, for arresting the sediment in the water drum or drums, substantially as described.

7. The combination, with the horizontal steam and water drums and the vertical or substantially vertical circulating-tubes G, of the shell A, the water leg or legs, and the feed-water pipe or pipes $l$, entering said water leg or legs, substantially as described.

8. The combination, with the horizontal water and steam drums and the vertical or substantially vertical circulating-tubes, of the casing D, inclosing the same, and the horizontal deflector H, substantially as described.

9. The combination, with the horizontal water and steam drums and the vertical or substantially vertical circulating-tubes, of the casing D, inclosing the same, and the vertical deflector I, substantially as described.

10. The combination, with the horizontal water and steam drums and the vertical or substantially vertical circulating-tubes, of the casing D, inclosing the same, the horizontal deflector H, and the vertical deflector I, substantially as described.

11. The combination, with the water drum or drums and the vertical or substantially vertical circulating-tubes G, of the baffle plate or plates n, for arresting the sediment in the water drum or drums, and the blow-off pipe or pipes, substantially as described.

In testimony whereof I have hereunto set my hand in the presence of two subscribing witnesses.

WILLIAM COWLES.

Witnesses:
J. J. KENNEDY,
J. A. HOVEY.